United States Patent
Zhu et al.

(10) Patent No.: US 11,064,130 B2
(45) Date of Patent: Jul. 13, 2021

(54) METHOD AND DEVICE FOR CONTROLLING FRONT CAMERA, MOBILE TERMINAL AND STORAGE MEDIUM

(71) Applicant: BEIJING XIAOMI MOBILE SOFTWARE CO., LTD., Beijing (CN)

(72) Inventors: Nengjin Zhu, Beijing (CN); Hai Long, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/686,487

(22) Filed: Nov. 18, 2019

(65) Prior Publication Data

US 2020/0396368 A1 Dec. 17, 2020

(30) Foreign Application Priority Data

Jun. 17, 2019 (CN) .......................... 201910523583.9

(51) Int. Cl.
*H04N 5/235* (2006.01)
*H04N 21/422* (2011.01)
*H04N 5/225* (2006.01)

(52) U.S. Cl.
CPC ..... *H04N 5/2353* (2013.01); *H04N 21/42204* (2013.01); *H04N 5/2252* (2013.01); *H04N 21/42209* (2013.01)

(58) Field of Classification Search
CPC .......... H04N 5/2353; H04N 21/42204; H04N 21/42209; H04N 5/2252
See application file for complete search history.

(56) References Cited

U.S. PATENT DOCUMENTS

| 2014/0104451 | A1* | 4/2014 | Todeschini | H04N 5/23225 |
| | | | | 348/222.1 |
| 2017/0244897 | A1* | 8/2017 | Jung | H04N 5/23293 |
| 2019/0087198 | A1* | 3/2019 | Frascati | G06F 9/5061 |
| 2020/0128159 | A1 | 4/2020 | Xiao et al. | |
| 2020/0351395 | A1* | 11/2020 | Yang | H04N 5/2257 |
| 2020/0366774 | A1* | 11/2020 | Jia | H04M 1/02 |

FOREIGN PATENT DOCUMENTS

| CN | 106094990 A | 11/2016 |
| CN | 106933351 A | 7/2017 |
| CN | 108134900 A | 6/2018 |
| CN | 108965611 A | 12/2018 |
| CN | 108989492 A | 12/2018 |
| CN | 109101352 A | 12/2018 |
| EP | 3641295 A1 | 4/2020 |

OTHER PUBLICATIONS

Supplementary European Search Report in the European application No. 19212590.4, dated Sep. 1, 2020.
Partial European Search Report in the European application No. 19212590.4, dated Jun. 3, 2020.

* cited by examiner

*Primary Examiner* — Timothy J Henn
(74) *Attorney, Agent, or Firm* — Syncoda LLC; Feng Ma

(57) ABSTRACT

A method for controlling the front camera includes: an operation instruction for the front camera is received from an application; a trigger message is sent to a pop-up motor service to trigger the pop-up motor service to control a pop-up or retraction of the front camera; and the front camera is controlled based on the operation instruction to perform a corresponding operation.

18 Claims, 5 Drawing Sheets

METHOD AND DEVICE FOR CONTROLLING FRONT CAMERA, MOBILE TERMINAL AND STORAGE MEDIUM

CROSS-REFERENCE TO RELATED APPLICATION

This application claims priority to Chinese patent application No. 201910523583.9 filed on Jun. 17, 2019, the disclosure of which is hereby incorporated by reference in its entirety.

BACKGROUND

With the development of technologies for mobile terminals such as mobile phones, tablet computers and notebook computers, a front camera is often provided on a mobile terminal to realize photo capturing, video calls, face recognition, and other functions. In order to improve a screen-to-body ratio of a screen, and enable the screen to be more aesthetically pleasing and more reliable, some mobile terminals are each provided with a front camera capable of being popped up. When the front camera is not working, the front camera is retracted inside a housing of the mobile terminal. The front camera is popped up after a software program is activated, and a lens of the camera can be exposed, and the front camera is activated.

SUMMARY

The disclosure relates generally to the field of mobile terminals, and particularly relates to a method and device for controlling a front camera, a mobile terminal and a storage medium.

According to the first aspect of embodiments of the disclosure, a method for controlling a front camera is provided. The method may include the following operations.

An operation instruction for the front camera is received from an application.

A trigger message is sent to a pop-up motor service to trigger the pop-up motor service to control a pop-up or retraction of the front camera.

The front camera is controlled, based on the operation instruction, to perform a corresponding operation.

According to the second aspect of embodiments of the disclosure, a device for controlling a front camera is provided. The device may include a processor and a memory.

The memory storing one or more instructions for execution by the processor, the one or more instructions include: instructions for receiving, from an application, an operation instruction for the front camera; instructions for sending a trigger message to a pop-up motor service to trigger the pop-up motor service to control a pop-up or retraction of the front camera; and instructions for controlling, based on the operation instruction, the front camera to perform a corresponding operation.

According to the third aspect of embodiments of the disclosure, a mobile terminal is provided. The mobile terminal may include a front camera and a controller. The front camera is configured to be capable of being popped-up or retracted, and the controller is configured to control the front camera based on the method for controlling the front camera according to the first aspect.

According to the fourth aspect of embodiments of the disclosure, a non-transitory computer-readable storage medium is provided. The non-transitory computer-readable storage medium may have stored thereon instructions that, when executed by a processor of a mobile terminal, cause the processor to perform the method for controlling the front camera according to the first aspect.

It should be understood that the general description above and the detailed description below are merely exemplary and explanatory, but are not intended to limit the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the present disclosure.

DETAILED DESCRIPTION

Figure 1:
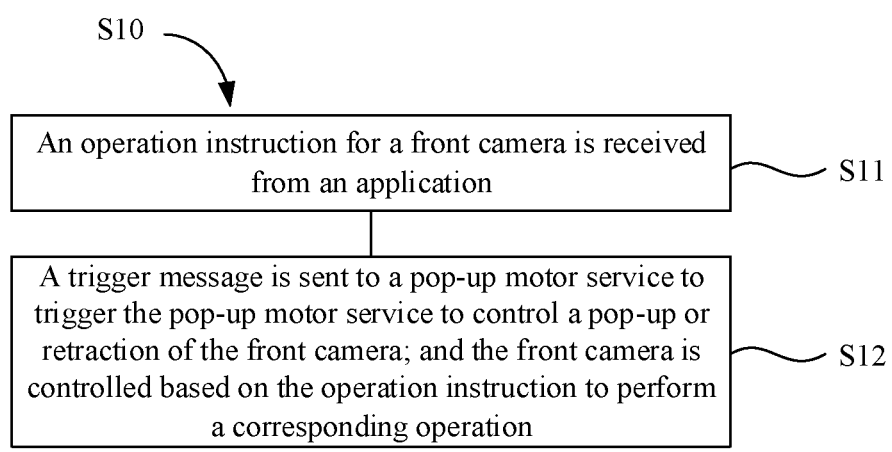
FIG. 1 is a flowchart of a method for controlling a front camera according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

While developing methods for controlling a pop-up front camera, the inventors have recognized that if a system service is used to process a request for popping-up the front camera, a request from the application layer and a pop-up/retraction event for the pop-up front camera are simultaneously processed in the service, or the program for controlling the front camera to pop up is embedded into the software of the front camera. Both methods cause long response time, increase the software risk and reduce the experience effect.

Various embodiments of the disclosure provide a method for controlling a camera. FIG. 1 is a flowchart of a method S10 for controlling a front camera according to some embodiments of the present disclosure. As illustrated in FIG. 1, the method S10 for controlling the front camera can include the following operations.

S11: an operation instruction for the front camera is received from an application.

A camera service is set in a mobile phone system and is used to control and manage various operation services of the camera.

The camera service receives, from the application, the operation instruction for the front camera. Here, the operation instruction may be sent by the application. The application may be any application that needs to call the camera, such as an image capturing program of a mobile terminal. The application may also be an application that is installed on the mobile terminal and that needs to acquire images through the front camera, such as image capturing software, image recognition software and payment software.

When the front camera is to be used by the application, the application calls the camera service. In an embodiment, the operation instruction may include, but not limited to, an image capturing control instruction, a video recording control instruction, an image capturing mode scene reference control instruction, a face recognition control instruction, a two-dimensional code scanning instruction and a depth map capturing instruction.

S12: a trigger message is sent to a pop-up motor service to trigger the pop-up motor service to control a pop-up or retraction of the front camera; and the front camera is controlled based on the operation instruction to perform a corresponding operation.

The camera service sends the trigger message to the pop-up motor service to enable the pop-up motor service to process the pop-up or retraction operation of the front camera. Moreover, the camera service performs the operation on the front camera according to the operation instruction from the application.

It should be noted that the camera service and the pop-up motor service in the operating system are separately set and performed. That is, the camera service and the pop-up motor service each is implemented by adopting respective software architecture and do not interfere with each other. The operation of the front camera by the camera service and the pop-up or retraction operation of the front camera by the pop-up motor service are separately controlled and do not interfere with each other, so that the response time may be reduced, the operating efficiency may be increased, the pop-up or retraction error of the front camera caused by abnormalities of the application or other abnormalities of the system may be avoided, the jamming of the application caused by faults in the pop-up or retraction process of the front camera may be avoided, and the stability of the system is ensured.

In an embodiment, the operation that the operation instruction for the front camera is received from the application by the camera service includes the following operations.

When the front camera is to be used by the application, the application calls the camera service and sends the operation instruction for the front camera; and the camera service receives the operation instruction for the front camera.

In the embodiment, the camera service may be a service set in the system and may be used to be called after any application sends an image capturing operation instruction. The camera service may control the turning-on or turning-off of the front camera, or may also be used to control the front camera to take a picture.

In an embodiment, the camera service is independent of the pop-up motor service. This means that in the system, software architecture adopted for implementing the camera service is independent of software architecture adopted for implementing the pop-up motor service. The camera service is used to control the front camera to perform the operation corresponding to the operation instruction, and the pop-up motor service is used to control the pop-up or retraction operation of the front camera. The camera service and the pop-up motor service are independent of each other and do not interfere with each other.

In another embodiment, the pop-up motor service is an application layer service, thereby better ensuring the independence of the camera service and the pop-up motor service and facilitating the pop-up motor service to send a message to a user.

In an embodiment, the operation that the pop-up or retraction of the front camera is controlled by the pop-up motor service includes the following operations.

The pop-up motor service calls a bottom-layer motor service, here, the bottom-layer motor service includes a daemon process; and the bottom-layer motor service calls a motor running program to control the pop-up or retraction of the front camera.

In the embodiment, the system may be provided with the bottom-layer motor service which may be the daemon process in the system. When the system is started, the bottom-layer motor service is in a monitoring state and waits for being called, and the bottom-layer motor service may call the motor running program to control the pop-up or retraction of the front camera.

In an embodiment, the method S10 for controlling the front camera further includes the following operations.

The bottom-layer motor service acquires data detected by a geomagnetic sensor, and calculates a position of the front camera. The bottom-layer motor service may control a geomagnetic sensor by a sensor program to detect the position of the front camera, and the sensor program may feed the position of the front camera back to the bottom-layer motor service. By providing the geomagnetic sensor, it is possible to determine the position of the front camera and determine whether the pop-up or retraction operation is completed. The geomagnetic sensor may perform real-time monitoring or intermittent detection.

Figure 2:
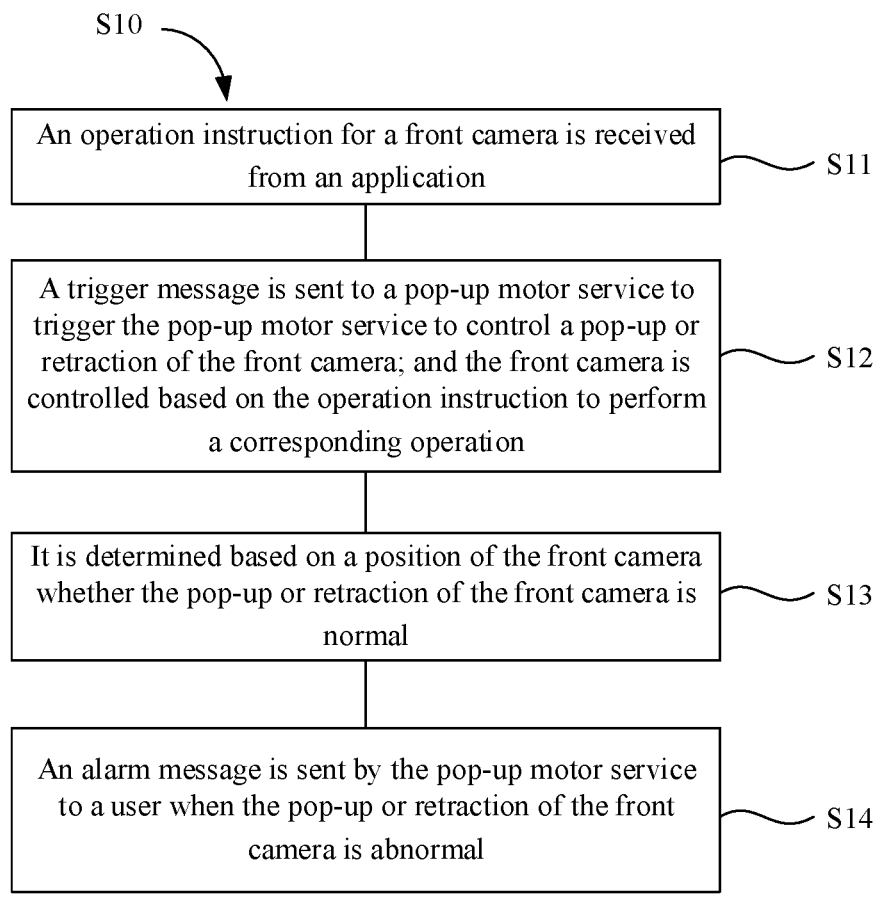
FIG. 2 is a flowchart of another method for controlling a front camera according to some embodiments of the present disclosure.

FIG. 2 is a flowchart of another method S10 for controlling a front camera according to some embodiments of the present disclosure. As illustrated in FIG. 2, in an embodiment, the method S10 for controlling the front camera further includes the following operations.

S13: it is determined based on the position of the front camera whether the pop-up or retraction of the front camera is normal.

S14: an alarm message is sent by the pop-up motor service to a user when the pop-up or retraction of the front camera is abnormal.

The bottom-layer motor service determines, based on the position of the front camera fed back by the sensor program, whether the pop-up or retraction of the front camera is normal. When the front camera completes the pop-up or retraction operation, the bottom-layer motor service sends a completion message to the pop-up motor service; when the front camera does not complete the pop-up or retraction operation, the bottom-layer motor service continues to call the motor running program to control the pop-up or retraction of the front camera.

If the pop-up or retraction operation of the front camera is still not completed after a preset time threshold, the bottom-layer motor service determines that the pop-up or retraction of the front camera is abnormal and the bottom-layer motor service may send a notification to the pop-up motor service, the pop-up motor service directly sends an alarm message to the user. It is unnecessary to feed back the alarm message to the camera service or the application, and it is unnecessary to send the alarm message to the user through the camera service or the application, thereby reducing the phenomenon of system jamming, and also increasing the operating efficiency of the system.

The position or status of the front camera is notified, after being determined by the geomagnetic sensor, to the bottom-layer motor service, and the bottom-layer motor service makes different responses according to different conditions. After the pop-up or retraction of the front camera is completed, a completion notification is sent to the pop-up motor service.

The pop-up motor service may continue to receive the message from the camera service after receiving the completion notification. If the pop-up or retraction of the front camera is not completed due to faults in the pop-up or retraction process of the front camera, the bottom-layer motor service may continue to call the motor running program to control the pop-up or retraction of the front camera until the pop-up or retraction of the front camera is completed.

According to the abovementioned method embodiments of the present disclosure, by separating the pop-up motor service from the application software, a separate system service process is utilized for processing a pop-up function, so that coupling between the pop-up motor service and the application software is reduced, and the operation of a user is responded at the fastest speed on the premise of ensuring the stability of software, thereby reducing the time delay caused by the software, and realizing hardware protection and timely event response.

Figure 3:
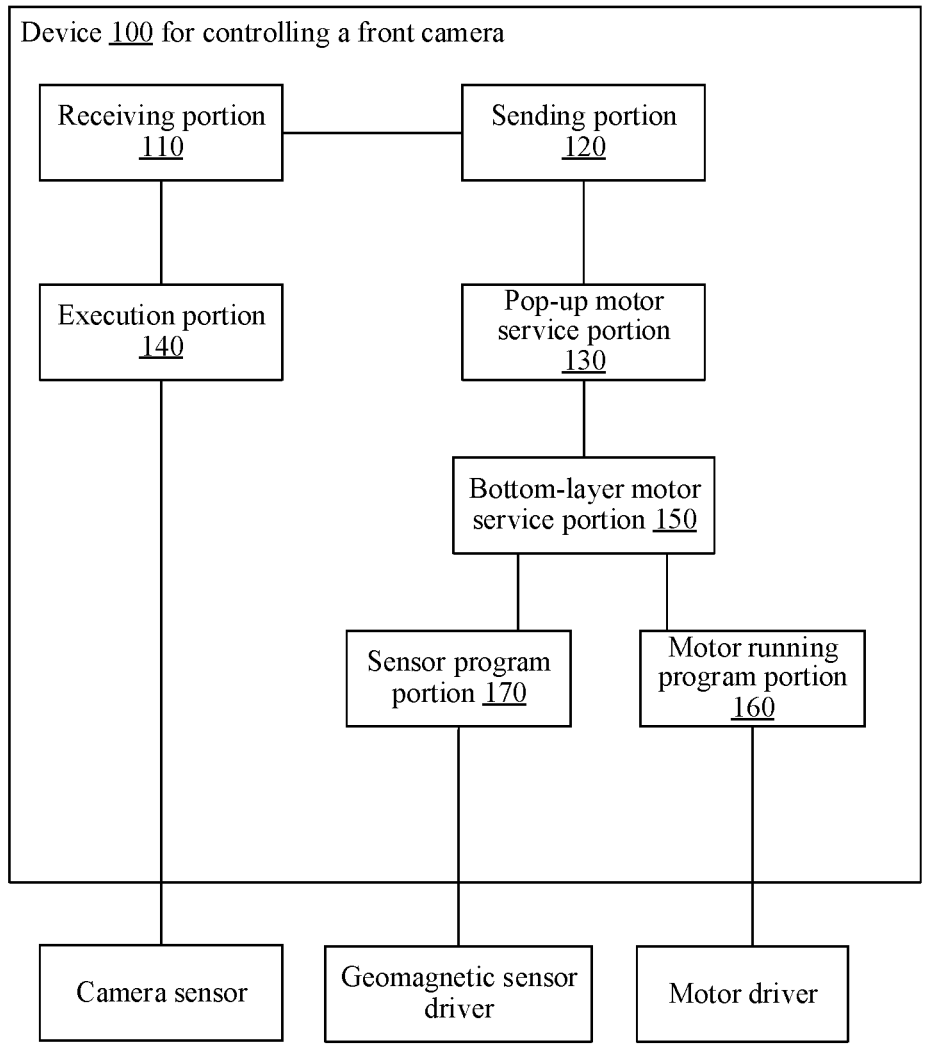
FIG. 3 is a block diagram of a device for controlling a front camera according to some embodiments of the present disclosure.

FIG. 3 is a block diagram of a device 100 for controlling a front camera according to some embodiments of the present disclosure. Referring to FIG. 3, the device 100 for controlling the front camera includes a receiving portion 110, a sending portion 120, a pop-up motor service portion 130, an execution portion 140.

The receiving portion is configured to receive, from an application, an operation instruction for the front camera.

The sending portion 120 is configured to send a trigger message to the pop-up motor service portion 130.

The pop-up motor service portion 130 is configured to control the pop-up or retraction of the front camera in response to the trigger message.

The execution portion 140 is configured to control, based on the operation instruction, the front camera to perform a corresponding operation.

In an embodiment, the execution portion 140 is independent of the pop-up motor service portion 130.

In an embodiment, the operation instruction includes a front camera control instruction, and the front camera control instruction includes at least one of: an image capturing control instruction, a video recording control instruction, an image capturing mode scene reference control instruction, a face recognition control instruction, a two-dimensional code scanning instruction, or a depth map capturing instruction.

In an embodiment, the pop-up motor service portion 130 is configured to call a bottom-layer motor service portion 150, and the bottom-layer motor service portion 150 is configured to call a motor running program portion 160 to control the pop-up or retraction of the front camera.

In an embodiment, the bottom-layer motor service portion 150 is further configured to acquire data detected by a geomagnetic sensor and calculate a position of the front camera. Here, the bottom-layer motor service portion 150 may call a sensor program portion 170 to acquire the position of the front camera detected by the geomagnetic sensor. The sensor program portion 170 may further be configured to feed the position of the front camera back to the bottom-layer motor service portion 150.

In an embodiment, the bottom-layer motor service portion 150 is further configured to determine, based on the position of the front camera, whether the pop-up or retraction of the front camera is normal; and the pop-up motor service portion 130 is further configured to send an alarm message to a user when the pop-up or retraction of the front camera is abnormal.

In the device 100 for controlling the front camera in the above embodiment, the specific mode of the execution operation of each portion has been described in detail in the embodiments related to the methods and will not be described in detail herein.

Some embodiments of the present disclosure also provide a mobile terminal. The mobile terminal includes a front camera and a controller. The front camera may be configured to be capable of being popped-up or retracted. The controller is configured to control the front camera based on the methods for controlling the front camera in the abovementioned embodiments.

Figure 4:
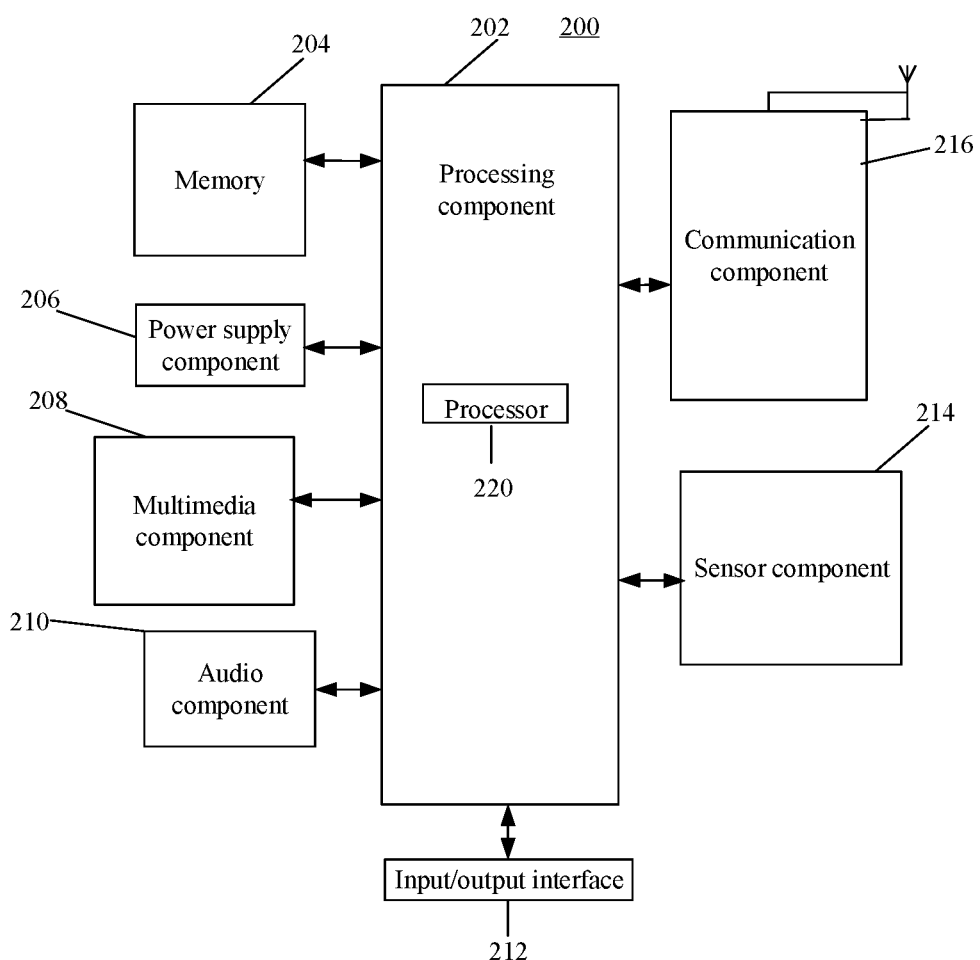
FIG. 4 is a block diagram of another device for controlling a front camera according to some embodiments of the present disclosure.

FIG. 4 is a block diagram of a device 200 for controlling a front camera according to some embodiments of the present disclosure. For example, the device 200 may be a mobile phone, a computer, a digital broadcast terminal, a messaging device, a game console, a tablet device, a medical device, a fitness device, a personal digital assistant, or the like.

Referring to FIG. 4, the device 200 may include one or more of the following components: a processing component 202, a memory 204, a power component 206, a multimedia component 208, an audio component 210, an input/output (I/O) interface 212, a sensor component 214, or a communication component 216.

The processing component 202 usually controls the overall operations of the device 200, such as operations related to display, telephone call, data communication, camera operations and recording operations.

The processing component 202 can include one or more processors 220 to execute instructions to complete all or partial operations of the above methods. Furthermore, the processing component 202 may include one or more portions to facilitate interaction between the processing component 202 and other components. For example, the processing component 202 can include a multimedia module to facilitate interaction between the multimedia component 208 and the processing component 202.

The memory 204 is configured to store various types of data to support the operations on the device 200. The examples of the data include instructions for any application or method operated on the device 200, contact data, phone book data, messages, pictures, videos, and the like. The memory 204 may be implemented by various types of volatile or non-volatile storage devices or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 206 supplies power to various components of the device 200. The power component 206 may include a power management system, one or more power sources, and other related components for generating, managing and distributing power for the device 200.

The multimedia component 208 includes a screen disposed between the device 200 and a user and configured to provide an output interface. In some embodiments, the screen may include a Liquid Crystal Display (LCD) and a Touch Panel (TP). In some embodiments, organic light-emitting diode (OLED) or other types of displays can be employed.

If the screen includes the touch panel, the screen can be implemented as a touch screen to receive input signals from users. The touch panel includes one or more touch sensors to sense touches, slides and gestures on the touch panel. The touch sensor may not only sense the boundary of the touch or slide operation, but also detect the duration and pressure related to the touch or slide operation. In some embodiments, the multimedia component 208 includes at least one of a front camera or a rear camera. When the device 200 is in an operation mode, such as an image capturing mode or a video mode, at least one of the front camera or the rear camera may receive external multimedia data. Each of the front camera and the rear camera may be a fixed optical lens system or has focal length and an optical zoom capability.

The audio component 210 is configured to output and/or input audio signals. For example, the audio component 210 includes a microphone (MIC). When the device 200 is in an operation mode, such as a call mode, a recording mode and a voice recognition mode, the microphone is configured to receive external audio signals. The received audio signals may be further stored in the memory 204 or sent through the communication component 216. In some embodiments, the audio component 210 also includes a loudspeaker configured to output audio signals.

The I/O interface 212 provides an interface between the processing component 202 and a peripheral interface portion, and the peripheral interface portion may be a keyboard, a click wheel, a button, and the like. The buttons may include, but are not limited to, a home button, a volume button, a starting button and a locking button.

The sensor component 214 includes one or more sensors configured to provide status assessments of various aspects to the device 200. For example, the sensor component 214 may detect an opened/closed status of the device 200 and the relative positioning of components such as a display and a keypad of the device 200, and the sensor component 214 may also detect the position change of the device 200 or a component of the device 200, the presence or absence of contact between a user and the device 200, the orientation or acceleration/deceleration of the device 200, and the temperature change of the device 200.

The sensor component 214 can include a proximity sensor configured to detect the presence of nearby objects without any physical contact. The sensor component 214 may also include an optical sensor, such as a Complementary Metal-Oxide Semiconductor (CMOS) or a Charge Coupled Device (CCD) image sensor for use in imaging applications. In some embodiments, the sensor component 214 may also include an acceleration sensor, a gyro sensor, a magnetic sensor, a pressure sensor or a temperature sensor.

The communication component 216 is configured to facilitate wired or wireless communication between the device 200 and other devices. The device 200 may access a wireless network based on the communication standard, such as Wi-Fi, 2G or 3G, or a combination thereof. In some embodiments, the communication component 216 receives broadcast signals or broadcast related information from an external broadcast management system through a broadcast channel. In some embodiments, the communication component 216 also includes a Near Field Communication (NFC) module for promoting short range communication. For example, the NFC module can be implemented based on a Radio Frequency Identification (RFID) technology, an Infrared Data Association (IrDA) technology, an Ultra Wide Band (UWB) technology, a Bluetooth (BT) technology and other technologies.

In some embodiments, the device 200 may be implemented by one or more of an Application Specific Integrated Circuit (ASIC), a Digital Signal Processor (DSP), Digital Signal Processing Device (DSPD), a Programmable Logic Device (PLD), a Field Programmable Gate Array (FPGA), a controller, a microcontroller, a microprocessor or other electronic components, and configured to execute the above methods.

Some embodiments of the disclosure also provide a computer-readable storage medium including instructions, such as the memory 204 including instructions, and the instructions may be executed by the processor 220 of the device 200 to complete the above methods. For example, the computer-readable storage medium may be a Read-Only Memory (ROM), a Compact Disc Read-Only Memory (CD-ROM), a magnetic tape, a floppy disk, an optical data storage device, and the like.

Figure 5:
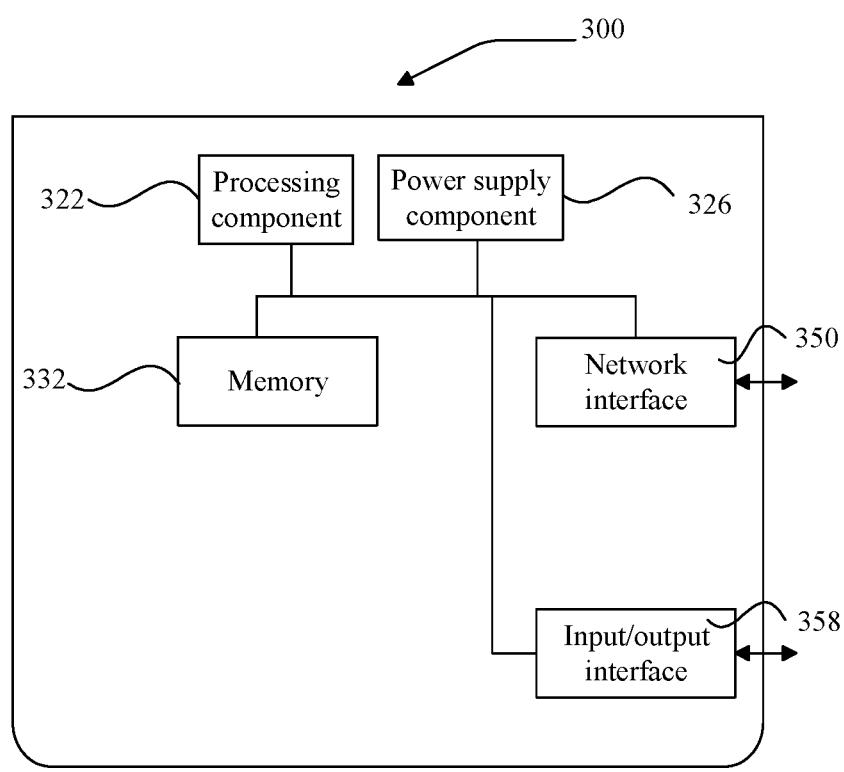
FIG. 5 is a block diagram of an electronic device according to some embodiments of the present disclosure.

FIG. 5 is a block diagram of an electronic device 300 according to some embodiments of the disclosure. For example, the device 300 can be provided as a server. Referring to FIG. 5, the device 300 includes a processing component 322, and further includes one or more processors and memory resources represented by a memory 332 for storing instructions capable of being executed by the processing component 322, such as application program.

The application program stored in the memory 332 can include one or more portions each of which corresponds to a set of instructions. Furthermore, the processing component 322 is configured to execute instructions to execute the above methods.

The device 300 may also include a power supply component 326 configured to execute power management of the device 300, a wired or wireless network interface 350 configured to connect the device 300 to the network, and an input/output (I/O) interface 358. The device 300 may operate an operating system stored in the memory 332, such as Windows Server™, Mac OS X™, Unix™, Linux™, FreeBSD™ or the like.

In the disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the disclosure can be understood by those of ordinary skill in the art on a case-by-case basis.

In the description of the disclosure, the terms "one embodiment," "some embodiments," "example," "specific example," or "some examples," and the like can indicate a specific feature described in connection with the embodiment or example, a structure, a material or feature included in at least one embodiment or example. In the disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in the disclosure can be implemented in digital electronic circuitry, or in computer software, firmware, or hardware, including the structures disclosed herein and their structural equivalents, or in combinations of one or more of them. Implementations of the subject matter described in the disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in the disclosure can be implemented as operations performed by a data processing apparatus on data stored on one or more computer-readable storage devices or received from other sources.

The devices in the disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in the disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), flexible displays, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination.

Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A device for controlling a front camera, comprising:
a processor; and
a memory storing one or more instructions for execution by the processor, the one or more instructions including:
instructions for receiving, from an application, an operation instruction for the front camera;
instructions for sending a trigger message to a pop-up motor service to trigger the pop-up motor service to call a bottom-layer motor service, wherein the bottom-layer motor service comprises a daemon process;
instructions for calling, by the bottom-layer motor service, a motor running program to control a pop-up or retraction of the front camera; and
instructions for controlling, based on the operation instruction, the front camera to perform a corresponding operation.

2. The device for controlling the front camera of claim 1, wherein the instructions for receiving, from the application, the operation instruction for the front camera comprises:
instructions for calling, by the application, a camera service when the front camera is to be used by the application, and sending, by the application, the operation instruction for the front camera; and
instructions for receiving, by the camera service, the operation instruction for the front camera.

3. The device for controlling the front camera of claim 1, wherein the camera service is independent of the pop-up motor service.

4. The device for controlling the front camera of claim 1, wherein the operation instruction comprises a front camera control instruction, and the front camera control instruction comprises at least one of: an image capturing control instruction, a video recording control instruction, an image capturing mode scene reference control instruction, a face recognition control instruction, a two-dimensional code scanning instruction, or a depth map capturing instruction.

5. The device for controlling the front camera of claim 1, wherein the pop-up motor service is an application layer service.

6. The device for controlling the front camera of claim 1, wherein the one or more instructions further comprise:
instructions for acquiring a position of the front camera detected by a geomagnetic sensor.

7. A device for controlling a front camera, comprising:
a processor; and
a memory storing one or more instructions for execution by the processor, the one or more instructions including:
instructions for receiving, from an application, an operation instruction for the front camera;
instructions for sending a trigger message to a pop-up motor service to trigger the pop-up motor service to control a pop-up or retraction of the front camera; and
instructions for controlling, based on the operation instruction, the front camera to perform a corresponding operation;

wherein the one or more instructions further comprise:
  instructions for acquiring a position of the front camera detected by a geomagnetic sensor;
  instructions for determining, based on the position of the front camera, whether the pop-up or retraction of the front camera is normal; and
  instructions for sending, by the pop-up motor service, an alarm message to a user when the pop-up or retraction of the front camera is abnormal.

8. A method for controlling a front camera, comprising:
  receiving, from an application, an operation instruction for the front camera;
  sending a trigger message to a pop-up motor service to trigger the pop-up motor service to call a bottom-layer motor service, wherein the bottom-layer motor service comprises a daemon process;
  calling, by the bottom-layer motor service, a motor running program to control a pop-up or retraction of the front camera; and
  controlling, based on the operation instruction, the front camera to perform a corresponding operation.

9. The method for controlling the front camera of claim 8, wherein the receiving, from the application, the operation instruction for the front camera comprises:
  in a case that the front camera is to be used by the application, calling, by the application, a camera service, and sending, by the application, the operation instruction for the front camera; and
  receiving, by the camera service, the operation instruction for the front camera.

10. The method for controlling the front camera of claim 9, wherein the camera service is independent of the pop-up motor service.

11. The method for controlling the front camera of claim 10, wherein software architecture adopted for the camera service is independent of software architecture adopted for the pop-up motor service, in an operating system of a mobile terminal.

12. The method for controlling the front camera of claim 8, wherein the operation instruction comprises a front camera control instruction, and the front camera control instruction comprises at least one of: an image capturing control instruction, a video recording control instruction, an image capturing mode scene reference control instruction, a face recognition control instruction, a two-dimensional code scanning instruction, or a depth map capturing instruction.

13. The method for controlling the front camera of claim 8, wherein the pop-up motor service is an application layer service.

14. The method for controlling the front camera of claim 8, further comprising:
  acquiring a position of the front camera detected by a geomagnetic sensor.

15. The method for controlling the front camera of claim 14, wherein the acquiring the position of the front camera detected by the geomagnetic sensor comprises: calling, by the bottom-layer motor service, a sensor program to control the geomagnetic sensor to detect the position of front camera; and feeding, by the sensor program, back the position of the front camera detected by the geomagnetic sensor to the bottom-layer motor service.

16. The method for controlling the front camera of claim 14, further comprising:
  determining, based on the position of the front camera, whether the pop-up or retraction of the front camera is normal; and
  sending, by the pop-up motor service, an alarm message to a user when the pop-up or retraction of the front camera is abnormal.

17. A mobile terminal implementing the method according to claim 8, the mobile terminal comprising the front camera and a controller, wherein
  the front camera is capable of being popped-up or retracted; and
  the controller is configured to control the front camera;
  wherein the mobile terminal has a pop-up motor service separate from other application software to thereby reduce coupling between the pop-up motor service and the other application software, and reducing time delay caused by the other application software.

18. A non-transitory computer-readable storage medium having stored thereon instructions for by a processor of a mobile terminal to cause the processor to perform the method for controlling the front camera according to claim 8.

* * * * *